2

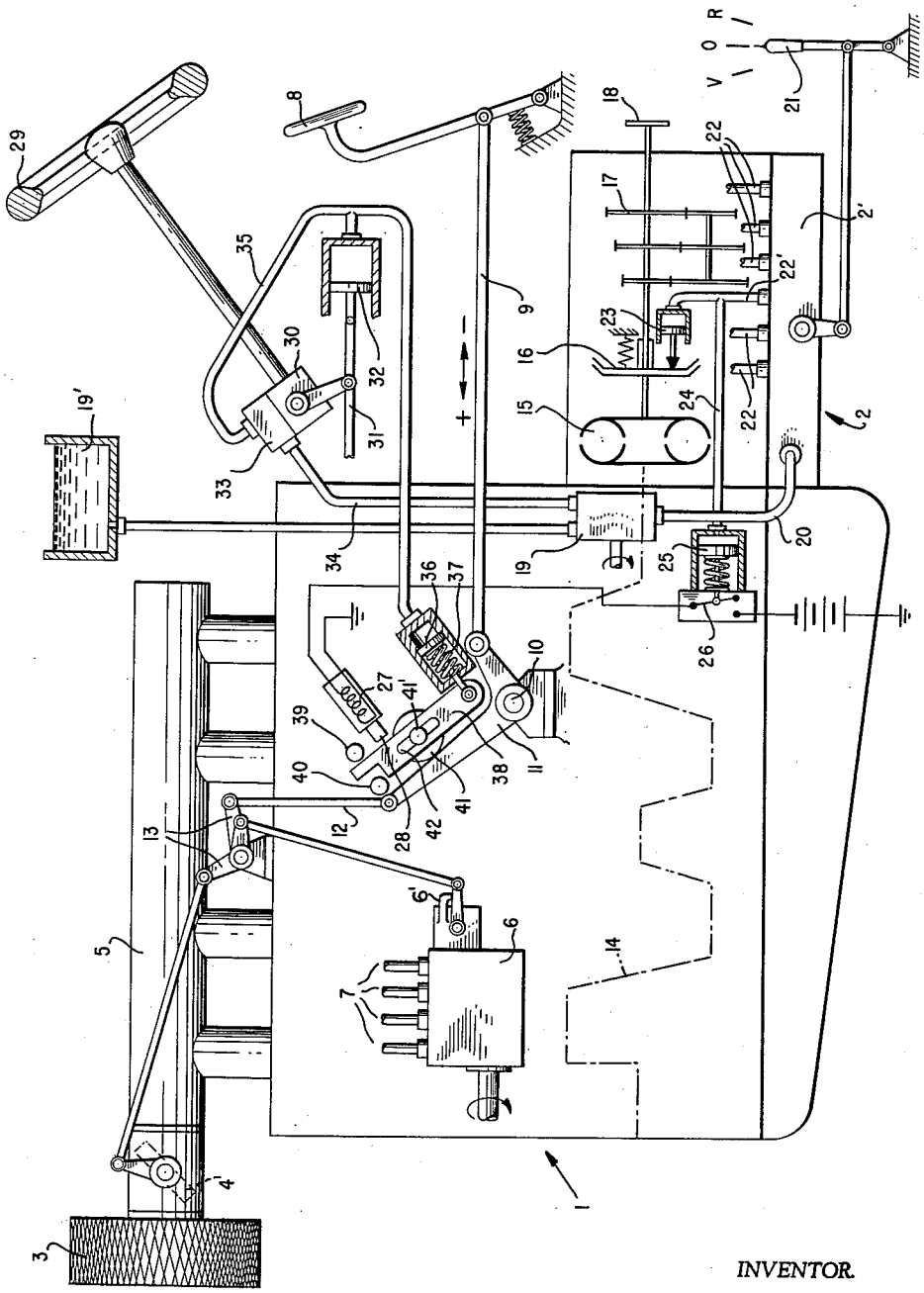

3,196,972
IDLING SPEED CONTROL ARRANGEMENT
Günter Perrin, Stuttgart-Hedelfingen, Germany, assignor to Daimler-Benz Aktiengesellschaft, Stuttgart-Unterturkheim, Germany
Filed Oct. 25, 1962, Ser. No. 233,115
Claims priority, application Germany, Nov. 4, 1961, D 37,385
6 Claims. (Cl. 180—77)

The present invention relates to a regulating or control system for the idling-speed torque of internal combustion engines, in motor vehicles provided with hydraulic auxiliary force power steering.

With such types of vehicles, there arises at the moment in which the auxiliary force becomes effective, that is, with a steering deflection of the wheel or after exceeding a certain magnitude of the steering deflection, a considerable need for pressure medium energy. This requirement for pressure medium energy has to be supplied by the pressure medium pump driven by the internal combustion engine. Under those circumstances, there exists the danger that, insofar as the internal combustion engine is idling, the engine stalls under the relatively larger load.

In order to avoid this drawback and shortcoming, it is proposed in accordance with the present invention to provide an installation for the adjustment of the idling-speed torque of the engine to a higher or larger value upon engagement of a force-transmitting position of the auxiliary-force power steering system. With such an installation, even the largest steering deflections can be brought about also during idling of the internal combustion engine, for example, while moving into or pulling out of a parking space, without stalling the internal combustion engine.

The present invention may be realized in a simple manner by providing an installation for increasing the torque which acts on the control linkage operatively connected with the gas pedal, especially in the form of an adjustment of an idling abutment.

For purposes of controlling the installation for increasing the torque, there may also be used a hydraulic pressure utilized in the auxiliary-force power steering for purposes of shifting-actuation or force-transmission, which influences or acts on the torque control either mechanically by way of a piston or the like or electrically by way of a switch and an electromagnet.

In motor vehicles which are provided with transmissions preferably automatic transmissions having hydrodynamic transmission elements, there is selected or engaged during starting of the vehicle a force-transmitting position of the transmission whereby the hydrodynamic transmission element initially operates with 100% slippage and in this manner opposes quite a considerable resistance to the internal combustion engine. If additional gas is not given immediately, then there exists the danger that the usual idling-speed torque of the engine is not sufficient to overcome this resistance and the rotational speed of the engine decreases to such an extent that the internal combustion engine is stalled and comes to a standstill.

In order to avoid this drawback, it is proposed in accordance with the present invention to adjust the idling-speed torque of the engine to a larger value not only in dependence on a force-transmitting position of the auxiliary-force power steering system but also in dependence on a force-transmitting position of the transmission. The arrangement may thereby be so made that one adjusting member each, influenced or operatively connected with the transmission and the auxiliary-force power steering, respectively, acts on a lever which transmits the movements of the adjusting members, especially with the aid of an adjustable transmission element, to the torque control linkage.

Accordingly, it is an object of the present invention to provide an idling speed control for internal combustion engines which avoids the aforementioned shortcomings and drawbacks encountered with the prior art installations.

It is another object of the present invention to provide an idling speed regulating mechanism for internal combustion engines which automatically increases the torque supplied in the engine-output when an increase of torque is necessary to prevent stalling of the engine by reason of an increase in a load driven by the engine which forms part of an auxiliary-force system.

Still a further object of the present invention resides in the provision of a control installation for internal combustion engines which automatically adjusts the engine to a higher torque when such higher torque is required to overcome losses in a hydrodynamic device during the starting of the engine or to supply the energy necessary to absorb the additional load presented by the pressure medium pump of the servo steering mechanism when, during idling of the engine, steering deflections are initiated at the steering wheel.

A further object of the present invention resides in the provision of a control installation for automatically increasing the torque of the internal combustion engine of a motor vehicle during idling thereof to prevent any undesired stalling of the engine, which installation is simple in construction, reliable in operation, and may be readily used with existing vehicle and power steering designs.

These and other objects, features and advantages of the present invention will become more obvious from the following description when taken in connection with the accompanying drawing which shows, in the single figure thereof, for purposes of illustration only, one embodiment in accordance with the present invention.

Referring now to the single figure of the drawing which illustrates a control installation in accordance with the present invention with a mixture-compressing injection-type internal combustion engine, reference numeral 1 generally designates in this figure the internal combustion engine which, for purposes of driving a motor vehicle, is provided with an automatic transmission generally designated by reference numeral 2. The combustion air reaches the common intake pipe or manifold 5 by way of a filter 3 past a throttle valve 4. A fuel-injection pump 6 driven by the internal combustion engine supplies the fuel by way of lines 7 to the combustion spaces. The torque control of the engine takes place from the gas pedal 8 which actuates by way of a linkage 9 a bell crank 11 supported at the engine at 10, which bell crank 11 is operatively connected, in turn, by way of a rod 12 with the bell crank 13. The movements of the bell crank 13 are transmitted, on the one hand, to the throttle valve 4 and, on the other, to the control rack of the injection pump 6.

A hydrodynamic coupling 15 is driven by the crankshaft 14 of the internal combustion engine 1, and a mechanical clutch 16 is connected to the output of the hydrodynamic coupling 15. A counter-shaft change-speed transmission 17 is provided following the clutch 16. Reference numeral 18 indicates the output leading to the driven wheels of the vehicle. Of course, it is understood that any suitable hydrodynamic device, clutch and/or change-speed gear, different from the one illustrated herein and of conventional construction may be used with the present invention.

A rod 31 leading to the steering links of the wheels is moved to and fro from the steering wheel 29 by way of a steering gear 30 of conventional construction. The movements of the rod 31 are assisted by a pressure piston 32 forming part of the power steering system. The control of the pressure oil required therefor takes place in dependence on the deflection of the steering wheel 29 within a control apparatus 33 of any conventional construction to which pressure oil is supplied by way of line 34 from a pump 19 driven by the internal combustion engine and fed from the tank 19'. The oil then reaches by way of line 35 the piston 32 and also a pressure piston 36 which is normally urged into the abutment position illustrated in the drawing by a compression spring 37. A lever 38 is pivotally secured at the piston rod of the piston 36, the movements of the lever 38 being limited by two abutments 39 and 40 fixed to the engine 1. Within the center region a transmission roller 41 serving as a secondary idling abutment is adjustably secured at the lever 38 for adjustment of the pivot axis thereof with the aid of a guide means 42 in the form of an elongated aperture. The roller 41 is secured at selected positions within the slot 42 by an adjustable fastening member 41'. For purposes of adjustment of the installation, the piston rod of the pressure piston 36 acting as adjusting member and the armature pin 28, to be described more fully hereinafter and also acting as adjusting member, are adjustable in the length thereof.

The oil pump 19 also supplies by way of line 20 pressure oil to the transmission 2. It is understood, however, that for this purpose a separate oil pressure system may also be provided. The pressure oil is used, on the one hand, for the hydrodynamic force transmission within the coupling 15 and, on the other, for the actuation of the individual shifting operations within transmission 2. Below the transmission 2, properly speaking, is disposed the valve box 2' with the shifting and control installations. A selector lever 21 effects the individual shifting positions within the valve box 2'. For sake of simplicity, only three positions corresponding to the forward, neutral and rearward positions are indicated in the drawing. Pressure oil lines 22 supply the pressure oil to the individual force-transmitting places and shifting places of the transmission. Illustrated in greater detail is a line 22' which leads to a pressure piston 23 for the engagement of the clutch 16. A line 24 branches off from this line 22'. The line 24 leads to a pressure piston 25 which actuates an electric switch 26. The switch 26 is connected in a circuit having an electromagnet 27. The armature pin 28 of the electromagnet 27 is disposed, in the normal rest position thereof corresponding to the position illustrated in the drawing and moves outwardly upon passage of current through the electromagnet 27, that is, downwardly toward the left in the drawing.

Operation

The operation of the control system in accordance with the present invention is as follows:

The drawing illustrates the position of the internal combustion engine and control elements thereof during normal idling operation. The control rack cooperating with the gas pedal 8 abuts against an idling abutment 6' on the injection pump 6 and releases at the throttle valve 4 and at the injection pump 6 the necessary air and fuel quantities. Normal idling is assured thereby.

If the steering wheel 29 is actuated, then the control apparatus 33 opens to the pressure oil derived from line 34 the path into line 35 whereby, on the one hand, the piston 32 assists the steering movement and, on the other, the piston 36 is displaced downwardly toward the left as seen in the drawing. As a result thereof, one end of the lever 38 abuts against the abutment 39 and thereupon also presses by way of roller 41 the bell-crank 11 downwardly toward the left, i.e., rotates the bell crank 11 in the counterclockwise direction. It can be readily seen from the drawing that both the injection pump 6 and the throttle valve 4 are displaced thereby in the sense of an increase in torque of the internal combustion enginte.

Equally, an increase in the idling-speed torque is to take place also when a higher resistance occurs within the transmission 2. For example, when the selecting lever 21 is shifted to the "forward" position, then pressure oil is applied to the piston 23 and the clutch 16 is engaged. The internal combustion engine now has to supply the entire energy which is required in the coupling 15 of which the secondary part, i.e., the right part in the drawing stands still as the vehicle has not yet begun to move. It is thereby assumed that the brakes are still applied and the vehicle is not even capable of starting to move. In that case, the flow resistance within the coupling 15 with 100% slippage would stall the engine if no more fuel and air were supplied thereto. This takes place in that the pressure oil present within the line 22' closes the switch 26 by way of line 24 and piston 25. As a result thereof, the energizing circuit for the electromagnet 27 is closed and the armature pin 28 is forced downwardly toward the left whereby the pin 28 also displaces the lever 38 and the roller 41 downwardly toward the left. The lever 38 then abuts against the abutment 40. Obviously, if both the power steering and the transmission are actuated at the same time, a combined displacement of lever 38 in accordance with the above description will occur.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A control installation for adjusting the idling-speed torque of internal combustion engines in motor vehicles having power steering means adapted to be actuated by the driver to a force-transmitting position in which the auxiliary force thereof is rendered effective, comprising control means including a gas pedal operatively connected with control linkage means for selectively controlling the torque produced by the engine and primary idling abutment means for maintaining said control means at least at a minimum idling position, secondary idling abutment means in the form of a lever pivotable against said control linkage means for establishing an instantaneous idling-speed position different from said minimum idling position of said control means, and further means operatively connected with said secondary idling abutment means at one free end of said lever for adjustment thereof to a position of larger idling-speed torque of the engine upon actuation of said power steering means to a force-transmitting position thereof, the other free end of said lever being movable between first and second fixed positions.

2. A control installation for adjusting the idling-speed torque of internal combustion engines in motor vehicles having power steering means adapted to be actuated by the driver to a force-transmitting position in which the auxiliary force means thereof is rendered effective, comprising control means for selectively controlling the torque produced by the engine, idling abutment means for effecting regulation of said control means, and further means operatively connected with said idling abutment means for adjusting said control means to a position of larger idling-speed torque of the engine upon actuation of said power steering means to a force-transmitting position thereof, said further means including hydraulically actuated means utilizing the hydraulic pressure from said power steering means and further including switch means and electromagnet means for electrically adjusting said control means to a larger idling-speed position thereof through selective actuation of said idling abutment means.

3. A control installation for adjusting the idling-speed torque of internal combustion engines in motor vehicles having power steering means adapted to be actuated by the driver to a force-transmitting position in which the auxiliary force means thereof is rendered effective, comprising control means including a gas pedal operatively connected with control linkage means for selectively controlling the torque produced by the engine and primary idling abutment means for maintaining said control means at least at a minimum idling position, secondary idling abutment means in the form of a lever pivotable at approximately the center thereof against said control means for establishing an instantaneous idling speed position different from said minimum idling position thereof, and further means operatively connected with said secondary idling abutment means at one free end of said lever for adjustment thereof to a position of larger idling-speed torque of the engine upon actuation of said power steering means to a force-transmitting position thereof the other free end of said lever being movable between first and second fixed positions, said further means including hydraulically actuated means provided with piston means utilizing the hydraulic pressure from said power steering means for mechanically adjusting said control means to the said larger idling-speed position thereof.

4. A control installation for adjusting the idling-speed torque of internal combustion engines in motor vehicles having power steering means adapted to be actuated by the driver to a force-transmitting position in which the auxiliary force means thereof is rendered effective, comprising control means including a gas pedal operatively connected with control linkage means for selectively controlling the torque produced by the engine, idling abutment means operatively associated with said control means for establishing the normal idling speed position thereof, and further means operatively connected with the abutment means of said control means for adjusting the abutment means of said control means to a position of larger idling-speed torque of the engine upon actuation of said power steering means to a force-transmitting position thereof, said further means including hydraulically actuated means utilizing the hydraulic pressure from said power steering means and further including switch means and electromagnet means for electrically adjusting said control means to a larger idling-speed position thereof through selective actuation of said idling abutment means.

5. A control installation for adjusting the idling-speed torque of internal combustion engines in motor vehicles having power steering means adapted to be actuated by the driver to a force-transmitting position in which the auxiliary force means thereof is rendered effective, comprising control means including a gas pedal operatively connected with control linkage means for selectively controlling the torque produced by the engine, idling abutment means operatively associated with said control means for establishing the normal idling speed position thereof, and further means operatively connected with the abutment means of said control means for adjusting the abutment means of said control means to a position of larger idling-speed torque of the engine upon actuation of said power steering means to a force-transmitting position thereof, said further means including hydraulically actuated means provided with piston means utilizing the hydraulic pressure from said power steering means for mechanically adjusting said control means to the said larger idling-speed position thereof, said abutment means including a lever arm pivotally connected at one end to said piston means and having a transmission means adjustably secured at the approximate center of said lever arm for contact with said control means during adjustment of said control means to the said larger idling-speed position thereof, the other end of said lever arm being selectively adjustably secured in position.

6. A control installation for adjusting the idling-speed torque of internal combustion engines in motor vehicles having power steering means adapted to be actuated by the driver to a force-transmitting position in which the auxiliary force means thereof is rendered effective, comprising control means including a gas pedal operatively connected with control linkage means for selectively controlling the torque produced by the engine, idling abutment means operatively associated with said control means for establishing the normal idling speed position thereof, and further means operatively connected with the abutment means of said control means for adjusting the abutment means of said control means to a position of larger idling-speed torque of the engine upon actuation of said power steering mean to a force-transmitting position thereof, said further means including hydraulically actuated means provided with piston means utilizing the hydraulic pressure from said power steering means for mechanically adjusting said control means to the said larger idling-speed position thereof, said abutment means including a lever arm pivotally connected at one end to said piston means and having a transmission means adjustably secured at the approximate center of said lever arm for contact with said control means during adjustment of said control means to the said larger idling-speed position thereof, a fixed stop member positioned a distance on either side of the other end of said lever arm so as to restrict the movement thereof, and means for selectively adjustably securing said other end of said lever arm in position between said fixed stop members.

References Cited by the Examiner
UNITED STATES PATENTS

| 2,229,055 | 1/41 | Dick | 192—.084 |
| 2,296,646 | 9/42 | Matulaitis. | |
| 2,913,921 | 11/59 | Gordon. | |
| 2,915,914 | 12/59 | Burnell et al. | 74—472 |
| 2,929,226 | 3/60 | Baker et al. | |
| 2,940,336 | 6/60 | Simpson et al. | 74—472 X |
| 2,997,144 | 8/61 | Gsching et al. | 74—472 |
| 3,022,849 | 2/62 | Braun | 180—77 |
| 3,042,134 | 7/62 | Majewski | 180—77 |

FOREIGN PATENTS

| 858,765 | 1/61 | Great Britain. |
| 874,522 | 8/61 | Great Britain. |

A. HARRY LEVY, *Primary Examiner.*